United States Patent
Linares (10) Patent No.: US 9,825,514 B1
(45) Date of Patent: Nov. 21, 2017

(54) ELECTRICAL GENERATOR OR MOTOR WITH VARIABLE COIL WINDING PATTERNS EXHIBITING MULTIPLE WIRES INCORPORATED INTO A PLURALITY OF INDEPENDENT THREE STAGE COIL CONFIGURATIONS AND INCORPORATING A BELT DRIVE ARRANGEMENT EXHIBITING FIRST AND SECOND ROTATING PULLY WHEELS IN COMBINATION WITH OPPOSITE BELT ROTATING MAGNET AND COIL SUPPORTING COMPONENTS FOR PROVIDING INCREASED POWER OUTPUT

(71) Applicant: MAESTRA ENERGY, LLC, Auburn Hills, MI (US)

(72) Inventor: Miguel A. Linares, Bloomfield Hills, MI (US)

(73) Assignee: MAESTRA ENERGY, LLC, Auburn Hills, MI (US)

( * ) Notice: Subject to any disclaimer, the term of this patent is extended or adjusted under 35 U.S.C. 154(b) by 499 days.

(21) Appl. No.: 14/615,091

(22) Filed: Feb. 5, 2015

Related U.S. Application Data (60) Provisional application No. 61/936,103, filed on Feb. 5, 2014.

(51) Int. Cl.
*H02K 23/60* (2006.01)
*H02K 16/02* (2006.01)
(Continued)

(52) U.S. Cl.
CPC ........... *H02K 16/005* (2013.01); *H02K 7/003* (2013.01); *H02K 16/02* (2013.01); *H02K 16/025* (2013.01);
(Continued)

(58) Field of Classification Search
CPC ...... H02K 23/60; H02K 16/005; H02K 16/02; H02K 16/025; H02K 16/00; H02K 16/04;
(Continued)

(56) References Cited

U.S. PATENT DOCUMENTS 2,696,585 A * 12/1954 Vermillion ........... H02K 16/025
                                                        310/118
4,456,858 A    6/1984 Loven
(Continued)

FOREIGN PATENT DOCUMENTS

FR         2995743 A1    3/2014
GB      191513481 A      9/1916
(Continued)

*Primary Examiner* — Bernard Rojas
*Assistant Examiner* — Alexander Singh
(74) *Attorney, Agent, or Firm* — Dinsmore & Shohl LLP (57) ABSTRACT

An induction motor or generator assembly for converting either of an electrical input or rotating work input to a mechanical or electrical output. An outer annular arrayed component is rotatable in a first direction and includes a plurality of magnets. An inner concentrically arrayed and reverse rotating component exhibits a plurality of outwardly facing and circumferentially spaced array of coil-subassemblies opposing the magnetic elements, such that a gap separates the coil-subassemblies from the magnets. The coil sub-assemblies each include a plurality of concentrically arrayed coils configured within a platform support of the inner component. A drive box including a sleeve shaped trunk and a base, a pair of rotatable wheels supported at annular offset locations of said base and receiving looped ends of a belt, said belt also channeling upper and lower pulley rings associated with said inner and outer components.

18 Claims, 5 Drawing Sheets

(51) Int. Cl.
  *H02K 16/00* (2006.01)
  *H02K 16/04* (2006.01)
  *H02K 7/00* (2006.01)

(52) U.S. Cl.
  CPC .............. *H02K 23/60* (2013.01); *H02K 16/00* (2013.01); *H02K 16/04* (2013.01)

(58) Field of Classification Search
  CPC ........ H02K 1/2786; H02K 1/24; H02K 7/116; H02K 7/1163; H02K 7/003; F03D 1/025; F03D 1/0666; F03D 15/00; F03D 15/10; F03D 15/20; F03D 80/88
  USPC .............. 310/115, 121, 114, 113, 112, 83, 99
  See application file for complete search history.

(56) References Cited

U.S. PATENT DOCUMENTS

| | | |
|---|---|---|
| 4,663,536 A | 5/1987 | Roesel, Jr. et al. |
| 5,159,222 A | 10/1992 | Southall |
| 5,631,513 A | 5/1997 | Coles et al. |
| 6,034,460 A | 3/2000 | Tajima et al. |
| 6,049,152 A | 4/2000 | Nakano |
| 7,180,219 B2 | 2/2007 | Xu |
| 7,843,102 B1 | 11/2010 | Wyremba |
| 7,928,624 B2 | 4/2011 | Huppunen et al. |
| 7,965,011 B2 | 6/2011 | Liao |
| 8,084,912 B2 | 12/2011 | Mizushima |
| 8,106,558 B2 | 1/2012 | Yamamoto |
| 8,247,943 B2 | 8/2012 | Prucher |
| 8,247,944 B2 | 8/2012 | Gebregergis et al. |
| 8,344,572 B2 | 1/2013 | Moellgaard et al. |
| 8,482,179 B2 | 7/2013 | Nakamura et al. |
| 8,541,921 B2 | 9/2013 | Jang et al. |
| 8,552,609 B2 | 10/2013 | Nishiyama |
| 8,844,659 B2 | 9/2014 | Pieralisi |
| 9,709,027 B1 * | 7/2017 | Al-Hawaj ............... F03D 1/025 |
| 2004/0256941 A1 | 12/2004 | Yoneda et al. |
| 2005/0017591 A1 | 1/2005 | Brewster et al. |
| 2006/0103252 A1 | 5/2006 | Yokota |
| 2007/0096580 A1 | 5/2007 | Ketteler |
| 2008/0174195 A1 | 7/2008 | Tupper et al. |
| 2008/0296992 A1 | 12/2008 | Militzer |
| 2009/0021098 A1 | 1/2009 | Takeuchi |
| 2009/0289512 A1 | 11/2009 | Prucher |
| 2010/0013335 A1 | 1/2010 | Strube |
| 2010/0060097 A1 | 3/2010 | Peterson |
| 2010/0244611 A1 | 9/2010 | Akutsu et al. |
| 2011/0057534 A1 | 3/2011 | Goda |
| 2011/0298310 A1 | 12/2011 | Ross et al. |
| 2012/0161566 A1 | 6/2012 | Ikuta et al. |
| 2012/0235528 A1 | 9/2012 | Axford |
| 2013/0123057 A1 | 5/2013 | Markl |
| 2013/0127287 A1 | 5/2013 | Stephenson |
| 2013/0214541 A1 | 8/2013 | Kamper et al. |
| 2013/0214632 A1 | 8/2013 | Muniz Casais et al. |
| 2013/0237361 A1 | 9/2013 | Palfai et al. |
| 2014/0197709 A1 | 7/2014 | Hasegawa |
| 2014/0375164 A1 | 12/2014 | Deak et al. |

FOREIGN PATENT DOCUMENTS

| | | |
|---|---|---|
| GB | 501432 A | 2/1939 |
| GB | 762078 A | 11/1956 |
| JP | 3057913 U | 6/1999 |
| JP | 2007529988 A | 10/2007 |
| JP | 2012044842 A | 3/2012 |
| JP | 2012515520 A | 7/2012 |
| JP | 5550829 B2 | 7/2014 |
| WO | 0118940 A2 | 3/2001 |
| WO | 2012017302 A1 | 2/2012 |

* cited by examiner

ELECTRICAL GENERATOR OR MOTOR WITH VARIABLE COIL WINDING PATTERNS EXHIBITING MULTIPLE WIRES INCORPORATED INTO A PLURALITY OF INDEPENDENT THREE STAGE COIL CONFIGURATIONS AND INCORPORATING A BELT DRIVE ARRANGEMENT EXHIBITING FIRST AND SECOND ROTATING PULLY WHEELS IN COMBINATION WITH OPPOSITE BELT ROTATING MAGNET AND COIL SUPPORTING COMPONENTS FOR PROVIDING INCREASED POWER OUTPUT

CROSS-REFERENCE TO RELATED APPLICATIONS

This Application claims the benefit of U.S. Provisional Application 61/936,103 filed on Feb. 5, 2014, the contents of which is incorporated herein by reference in its entirety.

FIELD OF THE INVENTION

The present invention relates generally to electrical generators and motors and, more specifically, AC induction generator and motor assemblies for converting an electrical input to a rotating work output. More specifically, the present invention discloses an electrical induction generator or motor exhibiting redesigned magnet and coil supporting components which are reconfigured as outer and inner annular components and constructed to rotate in opposite directions during operation and for optimizing work output of the rotating shaft, this further including the integration of a belt drive and pulley assembly for increasing work output (i.e. either enhanced rotation of the shaft in an electric motor mode or increased current output in an electric generator mode).

BACKGROUND OF THE INVENTION

In electricity generation, an electric generator is a device that converts mechanical energy to electrical energy. A generator forces electric current to flow through an external circuit. As is further known, the source of mechanical energy may be a reciprocating or turbine steam engine, water falling through a turbine or waterwheel, an internal combustion engine, a wind turbine, a hand crank, compressed air, or any other source of mechanical energy. In practical applications, generators provide nearly all of the power for electric power grids.

As is further known, the reverse conversion of electrical energy into mechanical energy is done by an electric motor, and motors and generators have many similarities. Many motors can be mechanically driven to generate electricity and frequently make acceptable generators.

Electrical generators and motors (such as of the AC induction or DC variety) typically include an outer stator (or stationary component) which is usually shaped as a hollow cylinder containing copper wires which are wound or otherwise configured within the inner facing wall. In a motor configured application, electricity flowing into selected pairs of coils configured within the stator (a three phase motor typically includes three individual pairs of coils which are arranged in opposing and partially circumferentially offsetting fashion) results in rotation of an interiorly positioned rotor component.

The rotor is usually shaped as a solid cylinder that sits inside the stator (with a defined air gap between the outer cylindrical surface of the rotor and the inner cylindrical surface of the stator) with an output shaft extending from an axial centerline of the rotor. The rotor further includes a series of highly conductive elements (such as aluminum rods) embedded within its outer surface.

In an electric motor driving application, a separate current is fed to the rods via a commutator which is a mechanism used to switch the input of certain AC and DC machines and which usually includes a plurality of slip ring segments insulated from each other and from the rotor shaft. An armature current is supplied through a plurality of brushes (these typically being arranged in a stationary fashion in the prior art) and which are arranged in contact with the rotor supported and revolving commutator, this causing a required current reversal for applying power to the motor in an optimal manner as the rotator rotates from pole to pole (it being noted that the absence of such current reversal would result in the motor braking to a stop).

The stator simulates motion by switching applied current in an overlapping fashion (via the partially overlapping and circumferentially offset sets of coils integrated into the stator inner cylindrical wall). As is further known, the magnetic force created in the stator by energizing the wires or coils is opposed by the armature current supplied rods embedded within the rotor, such that the force of the magnetic field generated in the stator in the multi-phase (staged) fashion results in the driving the current in the rotor supported rods (and therefore the rods and rotor as well) at a right angle to the magnetic field induced, thereby rotating the magnetically suspended (air gap supported) rotor and output shaft at a desired speed without the necessity of any moving components.

In this fashion, magnetic fields are formed in both the rotor and the stator, with the product of these giving rise to the force generated driving torque applied to the (typically inner concentrically supported) rotor. As is further understood, one or both of these magnetic fields (as explained further by Faraday's Law and associated Lorentz Forces Law) must be made to change with the rotation of the motor, such as accomplished by switching the poles on and off at the correct time intervals or by varying the strengths of the poles.

Additional variations of more recent AC electric motors further include either synchronous or asynchronous motors (this again being based upon the speed of rotation of the magnetically generated field under Faraday's Law). In particular, a synchronous electric motor is an AC motor distinguished by a rotor spinning with coils passing magnets at the same rate as the AC and resulting magnetic field which drives it (i.e. exhibiting zero slip under typical operating conditions). In contrast, induction style motors must slip to produce torque and which operate under the principle of inducting electricity into the rotor by magnetic induction (as opposed to by direct electrical connection).

Additional known features include a commutator which is defined as a mechanism used to switch the input of certain AC and DC machines and consisting of slip ring segments insulated from each other and from the electric motor's shaft. In this application, the motor's armature current is supplied through an arrangement of stationary brushes in contact with the (typically) revolving commutator, which causes the required current reversal and applies power to the machine in an optimal manner as the rotor rotates from pole to pole.

Building upon the above explanation, and in an alternate generator application, the rotary shaft is again the input of the rotation by means of an outside work source and, upon being rotated, the configuration of the above-described coils passes by the magnets to create an electrical charge (or field) that becomes the output power variable. An induction generator or asynchronous generator is a type of AC electrical generator that uses the principles of induction motors to produce power.

Induction generators operate by mechanically turning their rotor faster than the synchronous speed, giving negative slip. A regular AC asynchronous motor usually can be used as a generator, without any internal modifications. Induction generators are useful in applications such as mini-hydro power plants, wind turbines, or in reducing high-pressure gas streams to lower pressure, because they can recover energy with relatively simple controls. To operate an induction generator must be excited with a leading voltage; this is usually done by connection to an electrical grid, or sometimes they are self-excited by using phase correcting capacitors.

Other known generator applications include a dynamo which is an electrical generator that produces direct current with the use of a commutator. Dynamos were the first electrical generators capable of delivering power for industry, and the foundation upon which many other later electric-power conversion devices were based, including the electric motor, the alternating-current alternator, and the rotary converter.

Features associated with the commutator include it comprising the moving part of a rotary electrical switch in certain types of electric motors or electrical generators that periodically reverses the current direction between the rotor and the external circuit. Commutators typically have two or more softer (fixed) metallic brushes in contact with them to complete the other half of the switch. In a motor, it applies power to the best location on the rotor, and in a generator, picks off power similarly. As a switch, it has exceptionally long life, considering the number of circuit makes and breaks that occur in normal operation.

Expanding on the above explanation, and as is further known, a commutator consists of a set of copper segments, fixed around the part of the circumference of the rotating machine, or the rotor, and a set of spring loaded brushes fixed to the stationary frame of the machine. Two (or more) fixed brushes connect to the external circuit, either a source of current for a motor or a load for a generator.

Each conducting segment on the armature of the commutator is insulated from adjacent segments through the use of an appropriate material. Many other insulating materials are used to insulate smaller machines; plastics allow quick manufacture of an insulator, for example. In other applications, the segments are held onto the shaft using a dovetail shape on the edges or underside of each segment, using insulating wedges around the perimeter of each commutation segment.

As is further known in the art, a commutator is also a common feature of direct current rotating machines. By reversing the current direction in the moving coil of a motor's armature, a steady rotating force (torque) is produced. Similarly, in a generator, reversing of the coil's connection to the external circuit provides unidirectional (i.e. direct) current to the external circuit.

Without a commutator, a dynamo becomes an alternator, which is a synchronous singly fed generator. Alternators produce alternating current with a frequency that is based on the rotational speed of the rotor and the number of magnetic poles.

Automotive alternators produce a varying frequency that changes with engine speed, which is then converted by a rectifier to DC. By comparison, alternators used to feed an electic power grid are generally operated at a speed very close to a specific frequency, for the benefit of AC devices that regulate their speed and performance based on grid frequency. When attached to a larger electric grid with other alternators, an alternator will dynamically interact with the frequency already present on the grid, and operate at a speed that matches the grid frequency.

Typical alternators use a rotating field winding excited with direct current, and a stationary (stator) winding that produces alternating current. Since the rotor field only requires a tiny fraction of the power generated by the machine, the brushes for the field contact can be relatively small. In the case of a brushless exciter, no brushes are used at all and the rotor shaft carries rectifiers to excite the main field winding.

The armature component of the device must carry current so it is always a conductor or a conductive coil which is oriented normal to both the field and to the direction of motion, torque (rotating machine), or force (linear machine). The armature's role is twofold, the first being to carry current crossing the field, thus creating shaft torque in a rotating machine or force in a linear machine (e.g. motor mode), the second role being to generate an electromotive force (EMF).

In the armature, an electromotive force is created by the relative motion of the armature and the field. When the machine acts in the motor mode, this EMF opposes the armature current, and the armature converts electrical power to mechanical torque, and power, unless the machine is stalled, and transfers it to the load via the shaft.

When the machine acts in the generator mode, the armature EMF drives the armature current, and shaft mechanical power is converted to electrical power and transferred to the load. In an induction generator, these distinctions are blurred, since the generated power is drawn from the stator, which would normally be considered the field.

Applications of electro-magnetic motor and generator assemblies in the patent art include the permanent magnet motor generator set of Strube, US 2010/0013335, which teaches a method of utilizing unbalanced non-equilibrium magnetic fields to induce a rotational motion in a rotor, the rotor moves with respect to the armature and stator. A three tier device (armature, rotor, and stator) has the armature and stator being fixed in position with the rotor allowed to move freely between the armature and stator.

To induce a rotational motion, the rotor, in its concave side uses unbalanced non-equilibrium magnetic fields created by having multiple magnets held in a fixed position by ferritic or like materials to act upon the magnets imbedded in the armature. The rotor, in its convex side has additional unbalanced non-equilibrium magnets and additional pole pair magnets to create a magnetic flux that moves with the moving fixed position fields to cut across closely bonded coils of wire in the stator to induce a voltage and current that is used to generate electrical power. Multiple permanent magnets of varying strength are geometrically positioned in multiple groups to produce a motive power in a single direction with the remainder of the unbalanced magnetic flux positioned and being used to cut across the coils of wire to produce continuous electric power.

Hasegawa, US 2014/0197709, teaches an assembly conducting wire for a rotary electric machine winding which includes a plurality of bundled wires, these being twisted in a circumferential direction, with the wires being welded together at a predetermined distance. US 2007/0096580, to Ketteler, teaches a stator for a three phase current electric machine such as for motor vehicles and which consists of a winding support having grooves and teeth. The windings are arranged in the grooves and the winding support consists of a plurality of identical segments which, after being wound, are shaped into a circular ring. The segments are then inserted into a cylindrical housing and, with their windings, form the cylindrical stator.

Liao, U.S. Pat. No. 7,965,011, teaches a brushless DC motor structure with a constant ratio of multiple rotor poles to slots of the stator and which is characterized primarily by forming the stator of the motor by multiple ferromagnetic silicon steel sheets, where the ferromagnetic silicon steel sheets are provided with the multiple slots whose number is a multiple of 15, and the stator of the motor is formed by windings of the three phases, X, Y, and Z. Each phase includes 2 to 4 phase portions and each group has 5 slots. The rotor of the motor is made up of a plurality of arced magnets which are fixed orderly and equally along a ferromagnetic steel ring, and the radial direction of each arced magnet is opposite to that of the adjacent magnetic poles. An arced magnet represents a magnetic pole, and the number of the magnetic poles is a multiple of 14 or 16, such as for reducing the cogging torque of the motor.

WO 2012/017302, to Kamper/Stellenbosch University, teaches an electrical energy conversion system which is particularly suited for use in wind energy conversion systems. A pair of magnetically separated permanent magnet machines are linked by a freely rotating rotor housing permanent magnets. The first machine is typically a synchronous generator, and the second an induction generator. The synchronous generator has a stationary stator which is connectable to an electrical system such as an electricity grid, and the induction generator has a rotor which is connectable to a mechanical drive system such as a wind turbine.

Kamper, US 2013/0214541, teaches an electrical energy conversion system which is particularly suited for use in wind energy conversion systems. The system includes two magnetically separated permanent magnet machines linked by a freely rotating rotor housing permanent magnets. The first machine is typically a synchronous generator, and the second an induction generator. The synchronous generator has a stationary stator which is connectable to an electrical system such as an electricity grid, and the induction generator has a rotor which is connectable to a mechanical drive system such as, for example, a wind turbine.

Prucher, U.S. Pat. No. 8,247,943 teaches a radial gap motor/generator having a thin annular array of magnets mounted for rotation to a stator in a radially spaced relation to at least one thin annular induction structure fixed to a stationary stator may be air or liquid cooled. The motor has at least radial gap between a magnetic core and the array and may include multiple gaps and multiple annular induction structures to increase the overall power density of the system.

An example of a planetary geared motor and dynamo is shown in Mizushima, U.S. Pat. No. 8,084,912, and which includes provision of planetary gear dynamo for reducing inverse torque when the functioning in a generator mode. Palfai, 2013/0237361, teaches a planetary gear assembly including a ring gear configured for connection to a rotor of an electric motor when in a first position and configured for connection to a housing of the electric motor when in a second position. A sun gear is configured for connection to the housing when the ring gear is in the first position and configured for connection to the rotor when the ring gear is in the second position. A plurality of planet gears are configured to mesh with the ring gear and the sun gear.

Also referenced are the brush holder clip to commutator assemblies shown in each of connector for motors and generators provided in the form of an integral V-shaped spring steel member having an electrical connector extending one of the legs thereof and opposite an apex of the clip and connector. The housing containing the commutator has a slot therein through which the brush holder passes. The V-shaped clip and connector is inserted into the slot and wedged between the brush holder and an edge of the slot. The clip and connector is electrically conductive and communicative with the brush holder and is adapted for mating interconnection with a wire or other conductor.

SUMMARY OF THE INVENTION

The present invention, while drawing from much the existing theory and teachings surrounding electrical motor and generator type conversion assemblies, in particular teaches an AC induction motor assembly for converting an electrical input to a mechanical or rotating work output. A related generator variant converts a rotating work input to a converted electrical output utilizing the same efficiencies achieved by the present design.

An outer annular arrayed component is rotatable in a first direction and an inner annular and concentrically arrayed component is rotatable in a second opposite direction, the components being separated by an air gap. The outer component exhibits an annular end surface supporting a plurality of magnetic elements in a first circumferentially extending array, the outer component having a rotatable shaft.

The inner component exhibits an outer facing end surface opposing the outer component and exhibits a plurality of coil sub-assemblies arranged in a second outwardly facing circumferentially extending array. The coil sub-assemblies each include a concentric arrayed plurality of coils arranged about a platform support associated with the inner component.

An outer annular array of individually insulated and rotating commutator segments are supported upon the inner components. A similar plurality of inner annular fixed and outwardly extending brushes are further established in continuous contact with inner annular surfaces associated with each of the commutator segments.

A drive box has a sleeve shaped trunk and a base, a pair of rotatable wheels supported at annular offset locations of the base and receiving looped ends of a belt. The belt also includes channeling upper and lower pulley rings associated with the inner and outer components.

The assembly operates in a first variant such that a current supplied to the components creates at least opposing magnetic fields in a desired phased or shifting manner resulting in relative rotation between said components and further resulting in a rotating work output delivered to the shaft. The assembly operates in a second variant such that a rotating work input supplied to the shaft creates at least opposing magnetic fields between said annular components for creating an electrical current output through the commutator to brush interface or potentially through outputs associated with the coil subassemblies.

A rotating platform structure is also provided within which the upper pulley ring is integrated, a housing secured upon a superstructure mounted upon the drive box. A spring biases each of the brushes in an exerting fashion in order to maintain a continuous contact profile with the commutator segments.

Other features include the outer annular component having a lower housing and the inner annular component an upper housing, a shaft associated with the outer component extending through a central through aperture associated with the inner component. Each of the coils further includes a plurality of wires wound or braided together. At least one of the wires can have a larger gauge as compared to one or more additional wire.

BRIEF DESCRIPTION OF THE DRAWINGS

Reference will now be made to the attached drawings, when read in combination with the following detailed description, wherein like reference numerals refer to like parts throughout the several views, and in which:

FIG. 1 is a perspective of the electrical generator or motor with the upper housing removed according to a non-limiting embodiment of the invention and which exhibits a plurality of circumferentially arranged and inwardly facing magnets associated with a shaft supporting and rotating component, in combination with an inner concentrically arranged and opposing array of individual coil sub-assemblies which are likewise arranged in plural and circumferential fashion about an inner coaxial rotating component which is driven in a direction opposite the outer rotating component, the generator or motor device further depicting an upper located and stationary brush housing established in continual contact with an outer annular and circular array of rotating commutator segments arranged in continuous biasing contact with the brushes for facilitating either rotating shaft or current output of the overall assembly in either motor or generator operational modes;

DETAILED DESCRIPTION OF THE PREFERRED EMBODIMENTS

As previously described, the present invention relates generally to electrical generators and motors and, more specifically, discloses AC induction generator or motor assemblies for converting into an electrical output a rotating work input applied to a shaft (generator mode) or, alternatively, converting an electrical input applied to the coils and magnets to a rotating work output (motor mode). More specifically, the present invention discloses an electrical induction generator or motor exhibiting redesign stator and rotor components for optimizing either electrical output (generator) of the rotating input applied to the rotor shaft (generator) or, alternately, work output of the rotating shaft resulting from electrical (current) input.

Given the above background description, the present invention discloses an improved arrangement of induction style AC generators or electric motors, in which an outer coaxial and inner facing circumferential array of magnets is incorporated into a redesigned rotor and which is opposed by an inner coaxially positioned and outwardly facing circumferential array of multi-wire wound/braided coil sub-assemblies respectively incorporated into a redesigned stator (magnet supporting component). The redesigned aspects of the stator and rotor (now outer and inner annular opposing and counter rotating components), in combination with the unique and novel aspects of the individually winding/braiding patterns of the multi-wire and serpentine arranged coil subassembly (or possibly segmented subassemblies), results in either improved electrical output of resulting from the configuration of the coils passing by the magnets to create an electrical charge or, in the alternate electrical motor variant, provides for an optimal work output of the rotor shaft in response to a given electrical input necessary for generating the opposing magnetic fields in the motor components.

Additional novel aspects of the present inventions include the incorporation of a belt and pulley arrangement including a pair of rotating wheels supported along annular spaced and interior structural support locations of the assembly, the wheels channeling closed loop ends of the continuous band which are also channeled around both a lower component forming a portion of an outer and inwardly facing magnet array, as well as channeled around an upper component forming a portion of an inner and outwardly facing coil supporting array, these constructed to rotate in opposite directions during operation and for optimizing work output of the rotating shaft, this further including the integration of a belt drive and pulley assembly for increasing work output.

Figure 1:
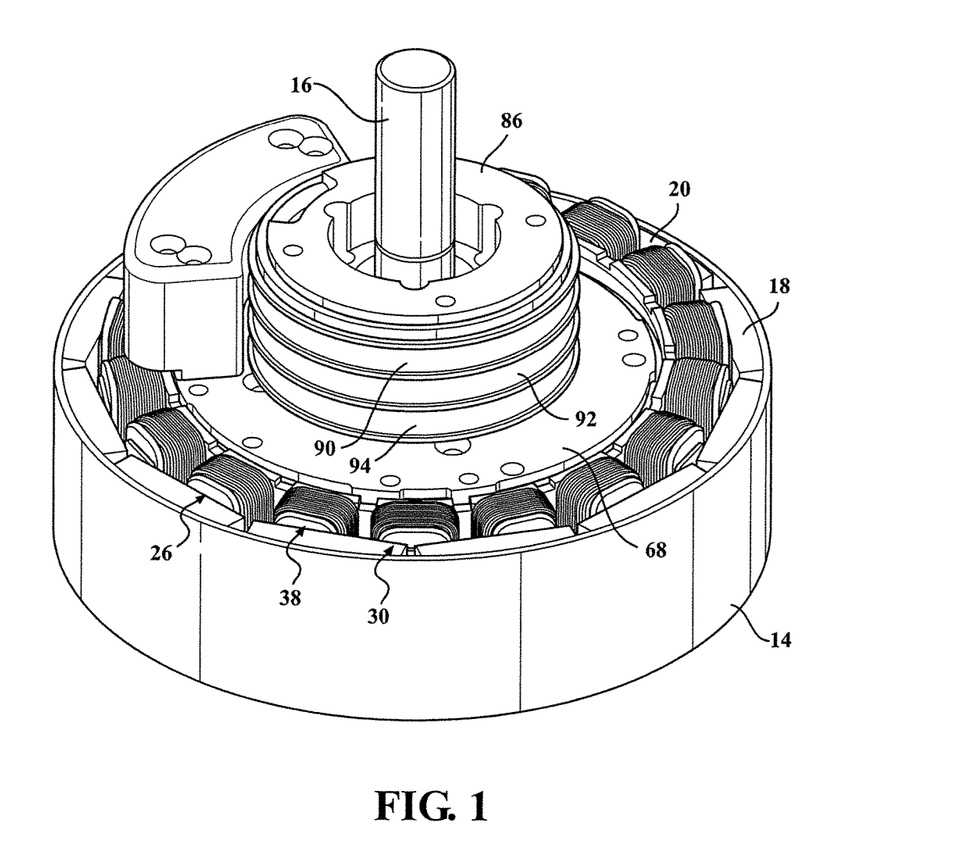
Figure 2:
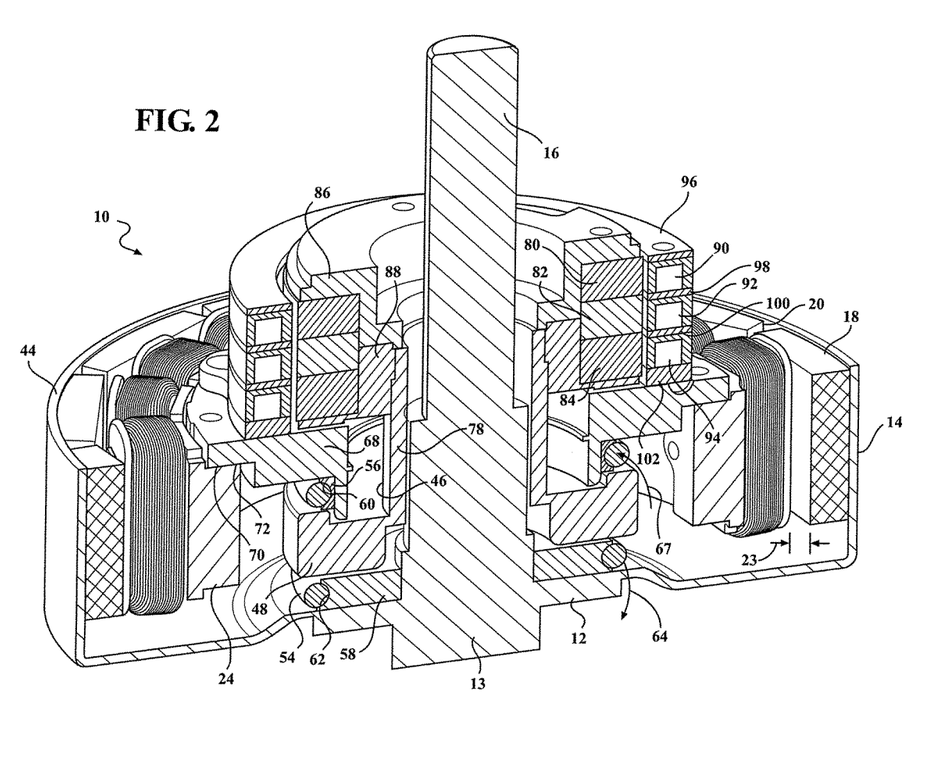
FIG. 2 is an assembly cutaway of the electric induction motor or generator and better illustrating the arrangement of the outer and inner coaxial and counter rotating components, as well as belt/pulley and commutator/brush components associated with the present inventions.

With reference to the above description, and referring initially to the cutaway assembly view of FIG. 2, an AC induction electric generator or motor is generally shown at 10 in cutaway fashion (and with each figure depicting both common and varied components of the common assembly in first and second perspective representations). A housing for the assembly includes a reconfigured rotor component, which is exhibited by a circular shaped base 12 with a reinforced central location 13. The base 12 in in the shape of an outwardly angled bottom disk terminating in an annular and upwardly extending end wall 14. A rotatable power output shaft 16 extends upwardly from the reinforced central location 12 of the base 12 and, in operation, interfaces with any type of work output component not limited to a gear associated with either a mechanical output or other electrical generator input, and such as is associated with a generator style capacity.

A plurality of magnets 18, 20, 22, et. seq. (see also best shown in FIG. 3) are arranged in circumferential and inwardly facing fashion about the inner annular surface of the outer end wall 14 according to a first perimeter extending array. Aside from a three dimensional and pseudo-rectangular shape (such exhibiting an arcuate outer configuration to conform to the inner annular profile of the wall 14) as best depicted in the illustrations, it is further understood that the magnets can be configured in any other shape or profile and can be provided with any variable of magnetic force configuration.

Figure 5:
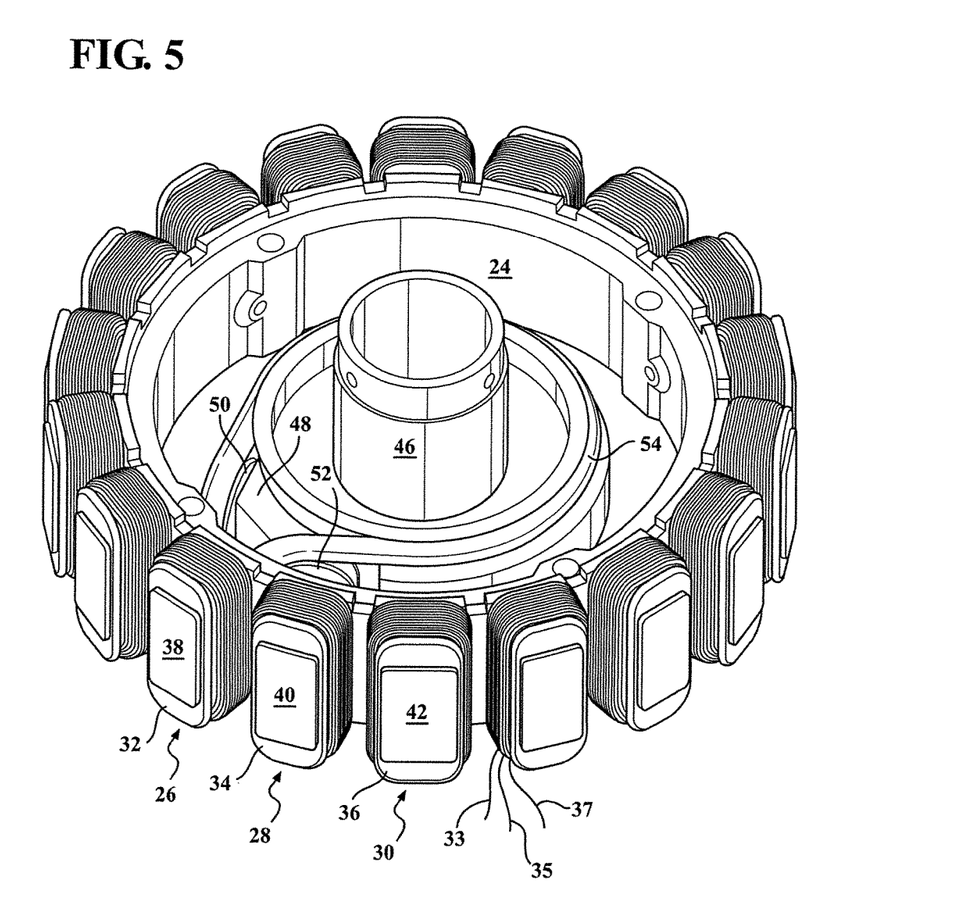
FIG. 5 is a perspective of the inner rotating component, exhibiting such as a structural ring shape which can be constructed of a plastic or other lightweight composite and which exhibits individual multi-wire coils supported in exteriorly facing and circumferentially arrayed fashion upon associated insulating portions and, with the removal of the circumferential array of magnets associated with the outer coaxial rotating component, better illustrates the potential variations in coil geometry and braiding patterns associated with the inner concentrically arranged and opposing array of coil sub-assemblies and which further enhances the performance characteristics of the assembly in either of motor or generator modes of operation.

Referencing again to FIG. 2, a redesign of the (traditionally) stator component includes an interior supported and generally annular shaped structure 24 this being configured in an inner concentric arrangement relative to the outer concentric positioned (and inwardly facing) magnets 18, 20, 22 et seq. supported upon the outer wall 14 of the rotor. As also shown in FIG. 5, the annular (ring) shaped structure 24 can exhibit a plastic or other lightweight composite material. The material construction of the outer magnet supporting component can also include any metallic or other composite material, such as which can further include any suitable insulating components for ensuring localization of generated magnetic fields in the desired and intended fashion (e.g. commutator, armature brushes, etc.).

As best shown in FIG. 2 when viewed in combination with FIG. 5, a plurality of individual coil subassemblies are shown, at 26, 28, 30, et seq. (eighteen in the illustrated embodiment), these arranged in circumferentially arrayed fashion according to a second outwardly facing perimeter array about the annular coil supporting structure 24. The coils can be arranged in any multi stage configuration (this facilitating the work output generating in either the generator or motor modes and by virtue of assisting in enhanced magnetic field (and consequent) rotary generating capabilities in application with the outer rotary magnet support component.

As further shown, a plurality of support platforms (see at 32, 34, 36, et seq. for each of subassemblies 26, 28, 30, et seq.) are provided in individual and circumferentially spaced fashion according to any shape and which are constructed of an insulating material configured for seating each individual arrangement of coils. The coils are wrapped in any desired fashion upon or around the insulating portions associated with each designated subassembly and can be energized by a current input in order to be driven in any multi-rotary staged fashion not limited to either of a two or three stage driving configuration. Separation gap 23 (FIG. 2) further defines a spatial arrangement between the inwardly facing magnets 18, 20, 22, et seq. and the outwardly facing coil sub-assemblies 32, 34, 36 et seq.

As further best shown in FIG. 5, the present invention also contemplates additional magnetic cores (see substantially thin walled and rectangular planar shaped elements 38, 40, 42, et. seq.) embedded into exposed surface locations of each insulating material supporting platform 32, 34, 36, et seq. The magnetic cores are configured such that they can be energized along with or alternatively of the individual coils and, in combination with the outer annularly positioned and inner facing/opposing magnets 18, 20, 22, et seq., which are separated via the specified annular air gap 23, again provide for controlled counter rotation of the outer and inner coaxial components.

In a further non-limiting aspect of the present invention, it is also contemplated that each individual coil may exhibit any multi-wire braiding or winding pattern, the number of wires, configuration of the windings and the like being further understood to contribute to the creation of a desired magnetic field produced profile in the stator-like inner annular rotatable and coil supporting component which, in combination with the fixed or variable fields generated in the outer concentrically arranged and inwardly facing magnets of the outer annular component, contributes to the driving of the magnetic supported component and resultant counter rotation of the coil supporting component. Without limitation, pluralities of three, five or other wire configurations can be provided for each wound or braided coil, with the gauge or diameter of any one or more given wires being larger than for associated inter-braided wires (see as shown by example by trailing wires 33, 35, 37 depicted in FIG. 5 and which can be wound together as one elongated and braided coil which defines multiple windings arranged in any desired pattern or arrangement about their respective supporting platform or core 32, 34, 36, et seq.

It is also contemplated that the individual coils can be wired together in any combination of inner, middle/intermediate and outer coils (beyond and additional to that depicted). Alternatively, the concentrically arrayed coils can be combined into a single coil or any other pattern of coil windings not limited to that shown and within the scope of the present inventions.

Although not shown, an upper and stationary housing is provided for the assembly and which can include such as an upper and annular outwardly extending top surface which terminates in an outermost annular rim exhibiting an underside edge arranged in close and upwardly spaced proximity to an upper rim edge 44 associated with annular end wall 14 of the rotor (again FIG. 2). It is also understood that slots, apertures or other suitable heat dissipation structure can be incorporated into the housing (typically formed into the stationary top portion thereof) and, along with any other configuration of tab, slot or bracket to facilitate mounting of the housing.

As further previously described, the present assembly design differs from the prior art in that the coil supporting (traditionally stator) component, as again depicted by annular structure 24 with supported coil winding patterns 26, 28, 30 et seq., is configured to rotate in a counter or opposite direction to the rotational direction of the magnetically supported outer coaxial housing with annular configured end wall 14, and according to a desired separation (or air gap) between counter-revolving components. As previously described, the material construction of the various redesigned components can include any metallic or other material, such as which can further include any suitable insulating components for ensuring localization of generated magnetic fields in the desired and intended fashion (e.g. commutator, armature brushes, etc.).

Figure 4:
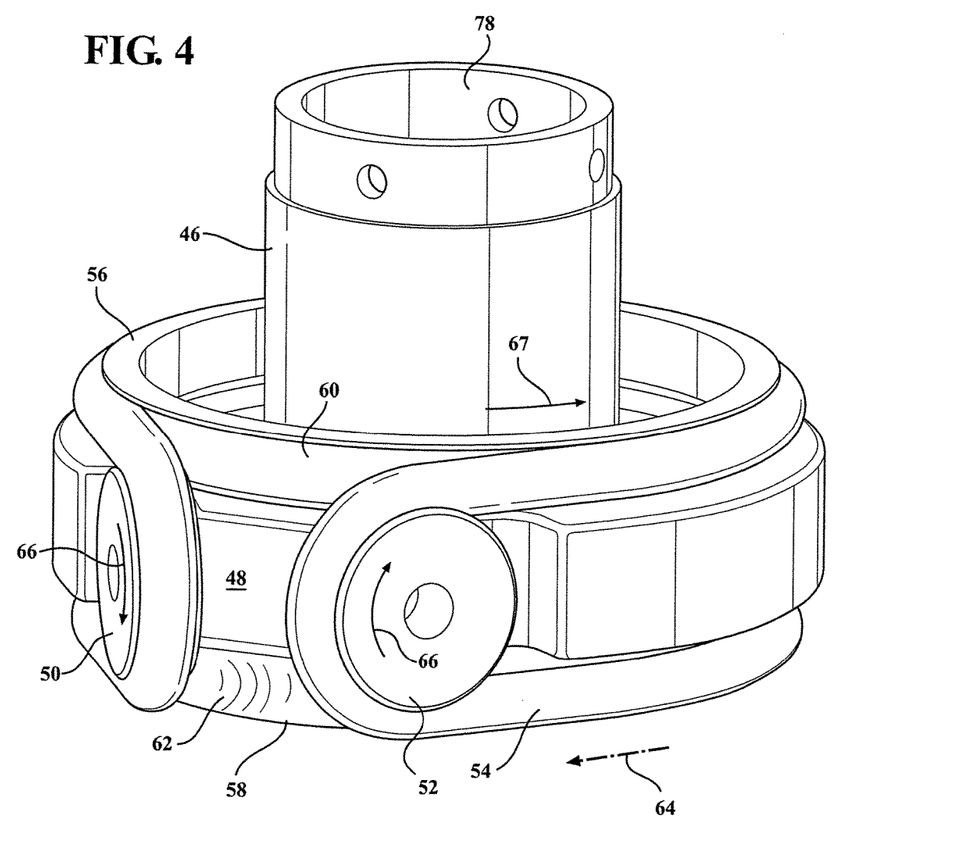
FIG. 4 is a sectional perspective of the belt and pulley assembly incorporating oppositely driven magnet and coil supported components in order to increase work output (i.e. either enhanced rotation of the shaft in an electric motor mode or increased current output in an electric generator mode)

With reference to FIG. 4, a sectional perspective is provided of a drive box, this depicted by annular trunk 46 with enlarged and likewise annular shaped base 48, which is integrated into the assembly (see also cutaway perspectives of FIGS. 2 and 5). A belt and pulley arrangement is provided and includes a pair of wheels 50 and 52 which are individually rotationally supported along annular spaced and interior structural support locations of the annular base 48 of the drive box subassembly.

As further shown, the wheels 50 and 52 are inwardly channeled about their outer peripheries foe receiving closed loop ends of a continuous and circular cross sectional band 54, such further constructed of a suitably durable synthetic material (e.g. a nylon, heavy neoprene, silicone or the suitable material) and exhibiting flexible and minimally stretchable properties. A pair of upper 56 and lower 58 ring shaped components (also termed pulleys) are also provided and which are each freely rotatably supported relative to the stationary supporting structure of the drive box components.

The ring shaped components 56/58 each further exhibit an exterior recessed and annular profile, see at 60 and 62, respectively, within which are received upper and lower extending portions of the band 54. In this manner, a linear travel direction of the band, see clockwise directional arrow at 64, corresponds to synchronized rotation of the wheels 50 and 52, as further exhibited by like clockwise directed arrows 66, and further so that a driving rotation of the lower ring 62 in the counterclockwise direction 64 corresponds to a counterclockwise driving direction 67 of the upper ring component 56.

As again shown in the assembly cutaway of FIG. 2, the drive box is incorporated into either of motor or generator configurations and such that the upper ring 56 is seated against an inner-most annular ledge of a structural portion 68 which in turn supports the annular body 24 of the coil arrays (see also mounting locations 70 and 72). The lower ring 58 is in turn supported upon an inside base surface of the lower body 12 in surrounding fashion about the upper extending rotor portions 16 and so as to define a further gap with the underside surface of the drive box base 48. Alternate to that shown, it is understood that suitable arcuate shaped guiding structure (such as in cross section exhibiting a suitable tab and slot or other structure) can be integrated between the seating locations defined between the ring shaped components 56/58 and the opposing upper and lower supporting surfaces of the base 48 or other structure for channeling the rings 56 and 58 in the desired counter rotating and driving fashion.

The supporting ledge, see at 74, associated with the coil supporting and rotating platform 68, downwardly extends in an inwardly spaced and annular fashion relative to an inner facing lip 76 associated with a configured upper surface of the drive box base 48 and so that the coil supporting ring pulley 56 and integrated platform 68 are supported in a nominally non-contacting fashion during annular rotation. As further shown in FIG. 2, the shaft 16 and associated internal base structure of the magnetic supported body 12 are configured so that they extend upwardly through the inner cylindrical surface (at 78) of the drive box trunk 46 in a non-contacting fashion.

With reference to the preceding background description regarding conventional brush and commutator arrangements, the present invention incorporates a plurality of fixed brushes, see at 80, 82 and 84, which are anchored to the exterior surface of the drive box trunk 46, such as via additional structural portions 86 and 88 which mount upon the cylinder in an outwardly annular fashion within the interior of the housing. An outer annular arrayed and inwardly opposing plurality of commutator segments 90, 92 and 94 are arranged to extend around the exterior surfaces of the brush housing. The segments are further supported within a suitable insulating material, see individual portions at 96, 98, 100 and 102, the lower most insulation portion mounting upon an annular upper surface of the rotating platform 68 in the manner best shown in FIG. 2.

Figure 3:
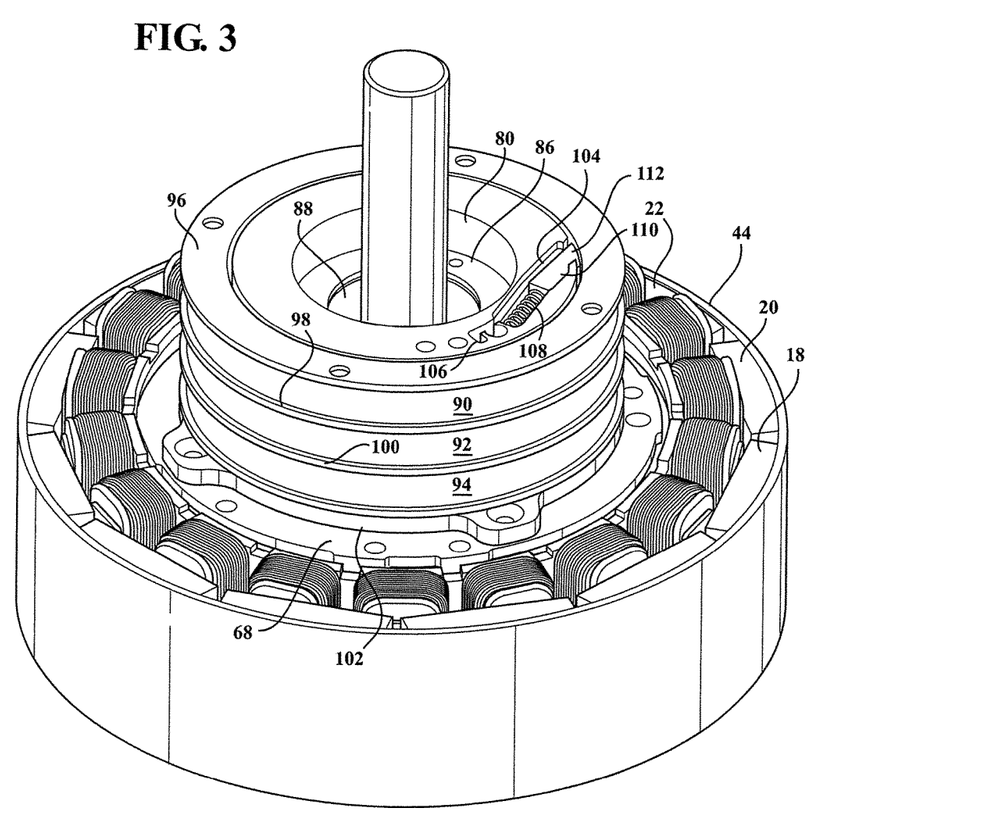
FIG. 3 is an overhead perspective as substantially shown in FIG. 1, with selected structural portions of the assembly removed, and better showing the outwardly angular and biasing arrangement established between the spring supported brushes and the inner facing and annular opposing contacting surfaces associated with the commutator segments.

As further best shown in FIG. 3 along with previously referenced FIG. 2, each of the annular stacked portions 80, 82 and 84 defining the brush housing (see again as best shown by uppermost portion at 80) each further exhibit a like plastic or other composite (typically insulation) portion. Each further exhibits a pocket, see at 104 for uppermost selected annular brush portion, defined in the selected brush housing 80 and which extends at an offset or oblique angled direction relative to a straight radial direction, and from an inner end located abutment surface 106 to an exposed outer end in communication with selected commutator segment 90.

A coil spring 108 is further shown in the cutaway of FIG. 3 and is mounted within the pocket so that an inner end seats against an inner abutment surface 106, a corresponding outer end of the of the spring 108 abutting and outwardly biasing an inner end surface of a brush 112, which in turn exhibits an outer contoured edge 112 adapted to contact in an exteriorly biasing and sliding fashion an opposing inner surface of the associated commutator segment 90. In this fashion, and during higher speed rotations of the encircling commutator segments, the outwardly spring biased brushes assist in maintaining a continuous contact profile between the brush and commutator segments, and so as to deliver a consistent armature current in either a work input (motor) or electrical output (generator) mode.

The individual wiring arrangements of the coils, in combination with the fixed commutator and rotating outer brush, are engineered to maximize the generation and application of magnetic fields in coils, these interfacing with the opposing magnetic field profile generated by the magnetic elements 18, 20, 22 et seq. in order to generate the driving forces explained in the previous analysis and in order to maximize the driving efficiency of the outer annular supported rotor component relative to the inner and counter rotating coil supporting component in an electric motor application. In the alternate generator application, the efficiencies released by the braiding of the multiple wire armature coil subassemblies results in both enhanced electromagnetic induction generated (EMF) forces resulting from the reversing fields created between the stator and rotor, along with superior collection of the electrical charge created between the coil subassemblies and magnets, further again as a result of the external powered rotating shaft, and which are delivered via the continuous contact profile maintained between the rotating commutator segments and the fixed and outwardly biased contacting brushes. In unique arrangements, a current output can also be collected from the counter rotating coil subassembly array.

Without limitation, the novel aspects of the magnetic generator or motor configurations depicted herein include but are not limited to the individual coil winding patterns (such as again which can include any plurality of individually braided wires of similar or varying gauge not limited to examples of the three, five or other pluralities of interbraided wiring patterns). Furthermore, the concentric and counter-driving arrangement of the inner coaxial coil supporting ring and outer coaxial magnetic component supporting ring is further understood to contribute, along with the coil winding geometries, to the efficiency of the AC magnetic induction motor or generator arrangements.

Notably, the present invention contemplates the counter rotating and driving pulleys operating in synchronicity with the magnetic fields generated between the coils and magnets in order to enhance the work output established by either the rotating shaft 16 in a motor variant or the current output delivered through an armature (not shown) associated with the brush housing in a generator variant. In this manner, the physical rotation work output or electrical current generating capabilities of the assembly can be increased (up to double) in certain variants. It is also understood and envisioned that other reconfigurations of the outer and inner coaxially arrayed components are contemplated and which will retain or enhance the efficiency of the design.

Having described my invention, other and additional preferred embodiments will become apparent to those skilled in the art to which it pertains, and without deviating from the scope of the appended claims.

I claim:

1. An electromagnet assembly for operating in either of a rotating work or electrical output mode, comprising:
    an outer annular arrayed component rotatable in a first direction and an inner annular and concentrically arrayed component rotatable in a second opposite direction, said components separated by an air gap;
    said outer component exhibiting an annular end surface supporting a plurality of magnetic elements in a circumferentially extending array, said outer component having a rotatable shaft;
    said inner component exhibiting an outer facing end surface opposing said outer component and exhibiting a circumferentially array of at least one coil sub-assembly;
    said coil sub-assemblies each including a concentric arrayed plurality of coils arranged about a platform support associated with said inner component;
    an outer annular array of individually insulated and rotating commutator segments supported upon said inner components, a similar plurality of inner annular fixed and outwardly extending brushes established in continuous contact with inner annular surfaces associated with each of said commutator segments; and
    a drive box including a sleeve shaped trunk and a base, a pair of rotatable wheels supported at annular offset locations of said base and receiving looped ends of a belt, said belt also channeling upper and lower pulley rings associated with said inner and outer components;
    said assembly operating in a first variant such that a current supplied to said components creating at least opposing magnetic fields in a desired phased or shifting manner resulting in relative rotation between said components and further resulting in a rotating work output delivered to said shaft; and
    said assembly operating in a second variant such that a rotating work input supplied to said shaft creating at least opposing magnetic fields between said annular components for creating an electrical current output through said commutator to brush interface.

2. The invention as described in claim 1, further a rotating platform structure within which said upper pulley ring is integrated, a housing secured upon a superstructure mounted upon said drive box.

3. The invention as described in claim 2, further comprising a spring biasing each of said brushes in an exerting fashion in order to maintain a continuous contact profile with said commutator segments.

4. The invention as described in claim 1, said outer annular component further comprising a lower housing and said inner annular component an upper housing, a shaft associated with said outer component extending through a central through aperture associated with said inner component.

5. The invention as described in claim 1, each of said coils further comprising a plurality of wires wound or braided together.

6. The invention as described in claim 5, at least one of said wires having a larger gauge as compared to one or more additional wire.

7. An electric motor, comprising:
    an outer annular arrayed component rotatable in a first direction and an inner annular and concentrically arrayed component rotatable in a second opposite direction, said components separated by an air gap;
    said outer component exhibiting an annular end surface supporting a plurality of magnetic elements in a circumferentially extending array, said outer component having a rotatable shaft;
    said inner component exhibiting an outer facing end surface opposing said outer component and exhibiting a circumferentially array of at least one coil sub-assembly;
    said coil sub-assemblies each including a concentric arrayed plurality of coils arranged about a platform support associated with said inner component;
    an outer annular array of individually insulated and rotating commutator segments supported upon said inner components, a similar plurality of inner annular fixed and outwardly extending brushes established in continuous contact with inner annular surfaces associated with each of said commutator segments; and
    a drive box including a sleeve shaped trunk and a base, a pair of rotatable wheels supported at annular offset locations of said base and receiving looped ends of a belt, said belt also channeling upper and lower pulley rings associated with said inner and outer components;
    said assembly operating such that a current supplied to said components creating at least opposing magnetic fields in a desired phased or shifting manner resulting in relative rotation between said components and further resulting in a rotating work output delivered to said shaft.

8. The invention as described in claim 7, further a rotating platform structure within which said upper pulley ring is integrated, a housing secured upon a superstructure mounted upon said drive box.

9. The invention as described in claim 8, further comprising a spring biasing each of said brushes in an exerting fashion in order to maintain a continuous contact profile with said commutator segments.

10. The invention as described in claim 7, said outer annular component further comprising a lower housing and said inner annular component an upper housing, a shaft associated with said outer component extending through a central through aperture associated with said inner component.

11. The invention as described in claim 7, each of said coils further comprising a plurality of wires wound or braided together.

12. The invention as described in claim 11, at least one of said wires having a larger gauge as compared to one or more additional wire.

13. An electric generator, comprising:
    an outer annular arrayed component rotatable in a first direction and an inner annular and concentrically arrayed component rotatable in a second opposite direction, said components separated by an air gap;
    said outer component exhibiting an annular end surface supporting a plurality of magnetic elements in a circumferentially extending array, said outer component having a rotatable shaft;
    said inner component exhibiting an outer facing end surface opposing said outer component and exhibiting a circumferentially array of at least one coil sub-assembly;

said coil sub-assemblies each including a concentric arrayed plurality of coils arranged about a platform support associated with said inner component;

an outer annular array of individually insulated and rotating commutator segments supported upon said inner components, a similar plurality of inner annular fixed and outwardly extending brushes established in continuous contact with inner annular surfaces associated with each of said commutator segments; and a drive box including a sleeve shaped trunk and a base, a pair of rotatable wheels supported at annular offset locations of said base and receiving looped ends of a belt, said belt also channeling upper and lower pulley rings associated with said inner and outer components;

said assembly operating such that a rotating work input supplied to said shaft creating at least opposing magnetic fields between said annular components for creating an electrical current output through the commutator to brush interface.

14. The invention as described in claim 13, further a rotating platform structure within which said upper pulley ring is integrated, a housing secured upon a superstructure mounted upon said drive box.

15. The invention as described in claim 14, further comprising a spring biasing each of said brushes in an exerting fashion in order to maintain a continuous contact profile with said commutator segments.

16. The invention as described in claim 13, said outer annular component further comprising a lower housing and said inner annular component an upper housing, a shaft associated with said outer component extending through a central through aperture associated with said inner component.

17. The invention as described in claim 13, each of said coils further comprising a plurality of wires wound or braided together.

18. The invention as described in claim 17, at least one of said wires having a larger gauge as compared to one or more additional wire.

* * * * *